United States Patent
Chu et al.

(10) Patent No.: US 10,702,815 B2
(45) Date of Patent: Jul. 7, 2020

(54) NANOSTRUCTURED FIBROUS MEMBRANES FOR MEMBRANE DISTILLATION

(71) Applicant: The Research Foundation for the State University of New York, Albany, NY (US)

(72) Inventors: Benjamin Chu, Setauket, NY (US); Benjamin S. Hsiao, Setauket, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 292 days.

(21) Appl. No.: 15/526,419

(22) PCT Filed: Nov. 18, 2015

(86) PCT No.: PCT/US2015/061229
§ 371 (c)(1),
(2) Date: May 12, 2017

(87) PCT Pub. No.: WO2016/081541
PCT Pub. Date: May 26, 2016

(65) Prior Publication Data
US 2017/0326486 A1 Nov. 16, 2017

Related U.S. Application Data

(60) Provisional application No. 62/081,634, filed on Nov. 19, 2014.

(51) Int. Cl.
*B01D 39/16* (2006.01)
*B01D 61/36* (2006.01)
(Continued)

(52) U.S. Cl.
CPC ..... *B01D 39/1692* (2013.01); *B01D 67/0004* (2013.01); *B01D 67/0088* (2013.01);
(Continued)

(58) Field of Classification Search
CPC ........ B01D 2239/0421; B01D 2323/02; B01D 2323/30; B01D 2323/39; B01D 2325/36;
(Continued)

(56) References Cited

U.S. PATENT DOCUMENTS

2003/0031697 A1* 2/2003 Chudzik .............. A61K 9/1641
424/423
2008/0254091 A1 10/2008 Lee et al.
(Continued)

FOREIGN PATENT DOCUMENTS

WO WO20130174040 * 5/2013

OTHER PUBLICATIONS

Guangzhi Zuo, Rong Wang; Novel membrane surface modification to enhance anti-oil fouling property for membrane distillation application; Journal of Membrane Science 447 (2013) 26-35. (Year: 2013).*

(Continued)

*Primary Examiner* — Pranav N Patel
(74) *Attorney, Agent, or Firm* — Carter, DeLuca & Farrell LLP

(57) ABSTRACT

Membranes suitable for use in membrane distillation are provided. Such membranes may include nano-fibrous layers with adjustable pore sizes. The membranes may include a hydrophobic nano fibrous scaffold and a thin hydrophilic protecting layer that can significantly reduce fouling and scaling problems.

14 Claims, 3 Drawing Sheets

(51) Int. Cl.
*B01D 67/00* (2006.01)
*D01D 5/00* (2006.01)
*D04H 1/4382* (2012.01)
*D04H 1/728* (2012.01)
*D04H 1/587* (2012.01)
*D01D 5/14* (2006.01)

(52) U.S. Cl.
CPC ......... *B01D 67/0093* (2013.01); *D01D 5/003* (2013.01); *D04H 1/4382* (2013.01); *D04H 1/587* (2013.01); *D04H 1/728* (2013.01); *B01D 61/364* (2013.01); *B01D 2239/0421* (2013.01); *B01D 2323/02* (2013.01); *B01D 2323/30* (2013.01); *B01D 2323/39* (2013.01); *B01D 2325/36* (2013.01); *D01D 5/0069* (2013.01); *D01D 5/0084* (2013.01); *D01D 5/14* (2013.01)

(58) Field of Classification Search
CPC .............. B01D 39/1692; B01D 61/364; B01D 67/0004; B01D 67/0088; B01D 67/0093; D01D 5/003; D01D 5/0084; D01D 5/14; D04H 1/4382; D04H 1/587; D04H 1/728
See application file for complete search history.

(56) References Cited

U.S. PATENT DOCUMENTS

| 2011/0031100 A1 | 2/2011 | Qtaishat et al. |
| 2013/0175218 A1 | 7/2013 | Chu et al. |
| 2014/0326658 A1 | 11/2014 | Singh et al. |

OTHER PUBLICATIONS

Du, et al., "Modification of poly(vinylidene fluoride) ultrafiltration membranes with poly(vinyl alcohol) for fouling control in drinking water treatment," Water Research, vol. 43, pp. 4559-4568 (2009).
Written Opinion of the International Searching Authority and International Search Report issued in Appl. No. PCT/US15/61229 dated Feb. 5, 2016.

* cited by examiner

NANOSTRUCTURED FIBROUS MEMBRANES FOR MEMBRANE DISTILLATION

CROSS REFERENCE TO RELATED APPLICATIONS

This application is a National Stage of PCT/US2015/061229 filed on Nov. 18, 2015, which, in turn, claims the benefit of, and priority to, U.S. Provisional Patent Application Ser. No. 62/081,634, filed Nov. 19, 2014, the entire disclosures of each of which are hereby incorporated by reference in their entirety.

BACKGROUND

Water purification is an important issue throughout the world. Water purification may be necessary for both industrial and non-industrial purposes. Difficulties with water purification can arise because of the diverse amounts of impurities in water, including polluted water and/or waste water from industrial processes.

Membrane distillation (MD) aims mainly at energy-efficient purification of highly contaminated waste water possessing a diverse amount of impurities. Membrane distillation is a thermally driven separation process that may be used to purify water in which separation is provided by a phase change across a barrier formed by a hydrophobic membrane for the liquid phase, but letting the vapor phase (e.g. water vapor) to pass through the membrane pores. The condensed water then coalesces to form droplets, which are then removed from the membrane, leaving the impurities behind.

Improvements in technology that can purify liquids, including water possessing a number of diverse contaminants, remain desirable.

SUMMARY

The present disclosure provides nanofibrous membranes suitable for membrane distribution, as well as methods for producing such membranes. The membrane system of the present disclosure includes a hydrophobic nanofibrous scaffold and a thin hydrophilic protecting layer that can significantly reduce fouling and scaling problems when compared with conventional membranes used in membrane distillation. In embodiments, the membrane may possess a structure having a change of hydrophobicity/hydrophilicity to promote removal of water droplets formed after water is passed through the hydrophobic nanofibrous scaffold.

In embodiments, methods for forming membranes in accordance with the present disclosure include applying to a substrate a hydrophobic nanofibrous scaffold including a hydrophobic polymer such as polystyrenes, polyolefins, polysulfones, fluoropolymers, polyesters, polycarbonates, polynitriles, polyacrylates, polyacetates, polyvinyl chloride, polyacrylic acids, polymethacrylic acids, polysiloxanes, cross-linked forms thereof, derivatives thereof and copolymers thereof, the hydrophobic nanofibrous scaffold including fibers having a diameter from about 1 nm to about 2,000 nm; casting a hydrophilic polymer solution such as polyvinyl alcohol, polysaccharides, polyalkylene oxides, ethylene glycols, gelatin, derivatives thereof, and combinations thereof, onto the nanofibrous scaffold; cross-linking the polymer solution to form a hydrophilic protecting layer having a thickness from about 10 nm to about 30 µm on the nanofibrous scaffold; and recovering a membrane suitable for membrane distillation.

Methods for treating contaminated water with membranes of the present disclosure are also provided. In embodiments, these methods include passing water through a suitable membrane. The membrane includes a hydrophobic nanofibrous scaffold including a hydrophobic polymer such as polystyrenes, polyolefins, polysulfones, fluoropolymers, polyesters, polycarbonates, polynitriles, polyacrylates, polyacetates, polyvinyl chloride, polyacrylic acids, polymethacrylic acids, polysiloxanes, cross-linked forms thereof, derivatives thereof and copolymers thereof, the hydrophobic nanofibrous scaffold including fibers having a diameter from about 1 nm to about 2,000 nm; a hydrophilic protecting layer having a thickness from about 10 nm to about 30 µm on at least a portion of the hydrophobic nanofibrous scaffold, the hydrophilic protecting layer including a polymer such as polyvinyl alcohol, polysaccharides, polyalkylene oxides, ethylene glycols, gelatin, derivatives thereof, and combinations thereof, wherein the hydrophilic polymer used to form the hydrophilic protecting layer has been cross-linked. Purified effluent that has passed through the membrane is then recovered.

Articles or membranes for use with membrane distillation are also provided. In embodiments, an article for membrane distillation of the present disclosure includes a hydrophobic nanofibrous scaffold including fibers having a diameter of from about 1 nm to about 2,000 nm, the hydrophobic nanofibrous scaffold including a hydrophobic polymer such as polystyrenes, polyolefins, polysulfones, fluoropolymers, polyesters, polycarbonates, polynitriles, polyacrylates, polyacetates, polyvinyl chloride, polyacrylic acids, polymethacrylic acids, polysiloxanes, cross-linked forms thereof, derivatives thereof and copolymers thereof; and a hydrophilic protecting layer on a surface of the nanofibrous scaffold, the hydrophilic protecting layer having a thickness from about 10 nm to about 30 µm.

BRIEF DESCRIPTION OF THE FIGURES

Various embodiments of the present disclosure will be described herein with reference to the following figures, wherein:

FIG. 1a=8% by weight PS; FIG. 1b=10% by weight PS; FIG. 1c=12% by weight PS; and FIG. 1d=15% by weight PS;

DETAILED DESCRIPTION

Figure 1A:
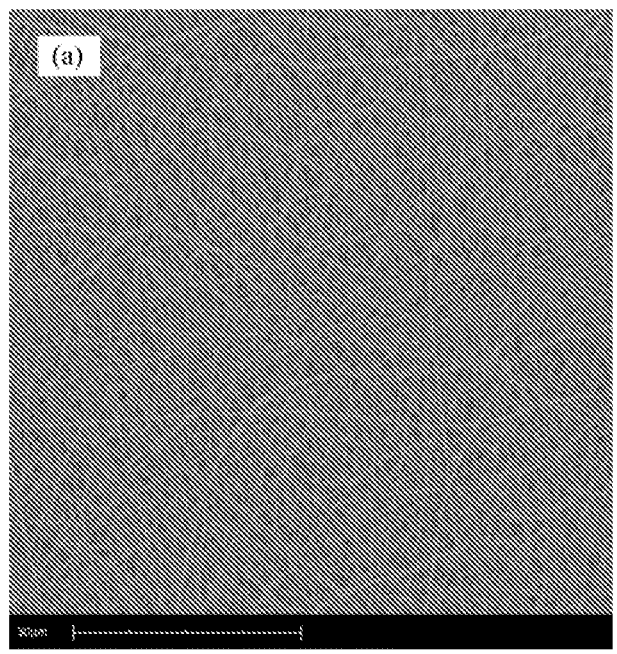
FIGS. 1a-1d are scanning electron microscopy (SEM) images of polystyrene (PS) nanofibers spun from different concentration solutions (from 8% by weight to 15% by weight) with the addition of 0.5% by weight sodium dodecyl sulfate (SDS) surfactant.

The present disclosure provides membranes for membrane distillation. The membranes include a hydrophobic nanofibrous scaffold and a thin hydrophilic protecting layer. In embodiments, the thin hydrophilic protecting layer can significantly reduce fouling and scaling problems that may arise with conventional membranes used for membrane distillation.

Suitable hydrophobic nanofibrous scaffolds for use with the membranes of the present disclosure may be made of suitable polymers within the purview of one skilled in the art, including, but not limited to, polystyrenes, polyolefins such as polyethylene and polypropylene, polysulfones such as polyethersulfone, fluoropolymers such as polyvinylidene fluoride, polyesters including polyethylene terephthalate, polytrimethylene terephthalate, and polybutylene terephthalate, polycarbonates, polynitriles such as polyacrylonitrile, polyacrylates such as polymethyl methacrylate, polyacetates such as polyvinyl acetate, polyvinyl chloride, polyacrylic acids, polymethacrylic acids, polysiloxanes such as polydimethylsiloxane, cross-linked forms thereof, derivatives thereof, copolymers thereof, and combinations thereof. In some embodiments, poly(acrylonitrile) (PAN), polyethersulfone (PES), polyvinylidenefluoride (PVDF), modified cellulose and modified chitosan, their chemical derivatives and/or copolymers, may be utilized. Combinations of the foregoing may also be used to form suitable scaffolds.

In some embodiments, polystyrene is used in forming a scaffold for use as part of a membrane of the present disclosure.

In forming the nanofibrous scaffold, the polymer is often first placed in a solvent, including non-polar solvents such as pentane, cyclopentane, hexane, cyclohexane, benzene, toluene, 1,4-dioxane, chloroform, diethyl ether, and dichloromethane, and/or polar aprotic solvents such as tetrahydrofuran, ethyl acetate, acetone, dimethylformamide, acetonitrile, dimethyl sulfoxide, nitromethane, and propylene carbonate. In embodiments, combinations of the foregoing solvents may be used. The amount of solvent may vary so that the polymer is present at an amount from about 3% by weight to about 20% by weight of polymer solution, in embodiments from about 5% by weight to about 18% by weight of polymer solution, in embodiments from about 8% by weight to about 15% by weight of polymer solution.

In embodiments, the hydrophobic nanofibrous scaffold may be fabricated using electro-spinning. Electro-spinning processes use electric force in forming fibers. The applied electric field potentials utilized in electrospinning can vary from about 10 to about 40 kV, in embodiments from about 15 to about 30 kV, with a distance between the spinneret and the collector of from about 5 to about 20 cm, in embodiments from about 8 to about 12 cm, and a solution flow rate of from about 10 to about 40 µl/minute, in embodiments from about 20 to about 30 µl/minute. In embodiments, the electrospinning process can use an applied electric field strength of about 2 kV/cm and a solution flow rate of about 25 µl/minute.

Multiple jet electro-spinning instrumentation may be used to fabricate high-quality electro-spun membranes having controlled fiber diameters and effective pore sizes, as well as pore size distribution, with all such parameters being variables across the membrane thickness. A multiple jet electro-spinning instrumentation may be used to deposit layers of materials with different fiber diameters, pore sizes, and surface properties to fabricate such an asymmetric membrane.

Smaller units with 4-8 jets may also be used for initial fabrications of electro-spun mats. Variation of fiber diameters during deposition and changes in surface activity permit one to form asymmetric wettability during the electro-spinning process.

Electro-spinning instrumentation without the use of spinneret may also be used to fabricate high-quality electro-spun membranes having controlled fiber diameters and effective pore sizes, as well as pore size distribution, with all such parameters being variables across the membrane thickness.

In some embodiments, it may be desirable to add a surfactant or another solvent-miscible liquid to the polymer solution utilized to form the hydrophobic nanofibrous scaffold to lower the surface tension of the solution, which may help stabilize the polymer solution during electro-spinning. Suitable surfactants include, for example, sodium dodecyl sulfate (SDS), octylphenoxypolyethoxy ethanol (commercially available as TRITON X-100), sorbitan monolaurate, sorbitan sesquioleate, glycerol monostearate, polyoxyethylene, polyoxyethylene cetyl ether, dimethyl alkyl amines and methyl dialkyl amines, and the like. Where utilized, the surfactant may be present in an amount from about 0.001 to about 10 percent by weight of the polymer solution, in embodiments from about 0.05 to about 5 percent by weight of the polymer solution, in embodiments from about 0.1 to about 2 percent by weight of the polymer solution.

In embodiments, the scaffold layer of the membrane, such as polystyrene (PS), may be electrospun on a substrate, such as a non-woven polyethylene terephthalate (PET) microfilter (AWA16-1 from SANKO LIMITED, 1316-1 Kawamuko cho, Tsuzuki-ku, Yokohama, 224-0044 Japan) utilizing methods within the purview of those skilled in the art. Other PET, polypropylene (PP), polyethylene (PE), polyurethane (PU) substrates, which may be spunbond or meltblown non-woven substrates, may also be utilized. In some embodiments, the hydrophobic nanofibrous scaffold may be fabricated using other solventless processing techniques, including electrospinning, electro-blowing, blowing-assisted electro-spinning, electrospinning, electro-blowing, solution-blowing, solvent-less multi-layered melt extrusion, melt-blowing, and combinations thereof.

Blowing-assisted electro-spinning and electro-blowing both use electric force and gas-blowing shear forces. In blowing-assisted electro-spinning processes, the electric force is the dominating factor, while the gas-blowing feature can assist in shearing the fluid jet stream and in controlled evaporation of the solvent (lower throughput, smaller diameter). In contrast, in electro-blowing processes the gas-blowing force is the dominating factor to achieve the desired spin-draw ratio, while the electric force may enable further elongation of fiber (higher throughput, larger diameter). Electro-spinning processes use only electric force, but without the assistance of gas flow. To the contrary, solution blowing processes use only gas flow, without the use of electric force.

Methods for forming fibers by electro-blowing are within the purview of those skilled in the art and include, for example, the methods disclosed in WO 2007/001405 and U.S. Patent Publication No. 2005/0073075, the entire disclosures of each of which are incorporated by reference herein. Briefly, in an electro-blowing process, an electrostatic field is combined with a gaseous flow field. Like melt blowing (no charge required), where the liquid droplet is pulled out by the gaseous flow, with electro-blowing the combined forces are strong enough to overcome the surface tension of the charged liquid droplet. This permits the use of electrostatic fields and gas flow rates that are significantly reduced compared to either method alone. Both the gaseous flow stream and the electrostatic field are designed to draw the fluid jet stream very fast to the ground. The spin-draw ratio depends on many variables, such as the charge density of the fluid, the fluid viscosity, the gaseous flow rate and the electrostatic potential. In some embodiments, these variables can be altered in mid-stream during processing. For example, injection of electrostatic charges can be used to increase the charge density of the fluid or even convert a neutral fluid to a charged fluid. The temperature of the gaseous flow can also change the viscosity of the fluid. The draw forces increase with increasing gaseous flow rate and applied electrostatic potential.

The intimate contact between the gas and the charged fluid jet stream provides more effective heat transfer than that of an electro-spinning process where the jet stream merely passes through the air surrounding the jet stream. Thus, the gas temperature, the gas flow rate, and the gaseous streaming profile can affect and control the evaporation rate of the solvent if the fluid is a solution. The gas temperature can vary from liquid nitrogen temperature to super-heated gas at many hundreds of degrees; a suitable temperature depends on the desired evaporation rate for the solvent and consequently on the solvent boiling temperature. The streaming profiles are aimed at stabilizing the jet streams and should be similar to those used in melt blowing.

In electro-blowing embodiments, the feeding rate of the polymer solution per spinneret for forming the nanofibrous scaffold may be from about 5 µL/minute to about 2500 µL/minute, in embodiments from about 20 µL/minute to about 300 µL/minute, in embodiments from about 35 µL/minute to about 150 µL/minute. The air blow temperature may be from about 0° C. to about 200° C., in embodiments from about 20° C. to about 120° C., in embodiments from about 25° C. to about 90° C. The air blow rate per spinneret may vary from about 0 standard cubic feet per hour (SCFH) to about 300 SCFH, in embodiments from about 5 SCFH to about 250 SCFH, in embodiments from about 20 SCFH to about 150 SCFH. The electric potential can be from about 1 kV to about 55 kV, in embodiments from about 15 kV to about 50 kV, in embodiments from about 30 kV to about 40 kV, with a conventional spinneret to collector distance of about 10 cm.

In view of the large volume of gas (e.g., air) used, such a blowing process becomes practical, if the removed solvent is nontoxic, e.g., water, that does not require further separation from the blowing gas. This is the case for the above melt-blowing process or for a solution blowing process where the solvent is water. Otherwise, the cost for such a fabrication process may be prohibitive and require alternative approaches.

Where the nanofibrous scaffold is formed by blow-assisted electrospinning, the feeding rate of the polymer solution per spinneret for forming the nanofibrous scaffold may be from about 5 µL/minute to about 150 µl/minute, in embodiments from about 10 µl/minute to about 80 µL/minute, in embodiments from about 20 µL/minute to about 50 µl/minute. The air blow temperature may be from about 0° C. to about 300° C., in embodiments from about 20° C. to about 120° C., in embodiments from about 25° C. to about 90° C. The air blow rate per spinneret may vary from about 0 standard cubic feet per hour (SCFH) to about 300 SCFH, in embodiments from about 5 SCFH to about 150 SCFH, in embodiments from about 20 SCFH to about 50 SCFH. The electric potential can be from about 1 kV to about 50 kV, in embodiments from about 15 kV to about 40 kV, in embodiments from about 20 kV to about 30 kV, with a conventional spinneret to collector distance of about 10 cm.

In membrane distillation, as well as conventional filtration, fouling of the membranes is due to the accumulation of unwanted materials, which can be living organisms or non-living substances. Non-living substances can be organic or inorganic. This fouling due to non-living substances is also referred to, in embodiments, as scaling. Where water purification is conducted with hydrophobic membranes, fouling/scaling is an unavoidable consequence. To reduce fouling/scaling, and thus increase the life of the membranes of the present disclosure, in embodiments it may be desirable to protect at least a portion of a surface of the electrospun hydrophobic nanofibrous scaffold with a durable, thin hydrophilic protecting layer.

This thin hydrophilic protecting layer may minimize the fouling and or scaling properties of the resulting membrane. In embodiments, the thin, hydrophilic protecting layer may be formed by cross-linking fluid-soluble polymers on the surface of the hydrophobic nanofibrous scaffold. In embodiments, the thin, hydrophilic protecting layer may be formed of water-soluble polymers, such as polyvinyl alcohol, polysaccharides (including chitosan and hyaluronan), polyalkylene oxides (including polyethylene oxide), gelatin, derivatives thereof, copolymers thereof, and combinations thereof. These polymers may be cross-linked to render the polymers suitable for use as the thin, hydrophilic protecting layer.

Cross-linking may be conducted using methods within the purview of those skilled in the art, including chemical cross-linking using cross-linking agents. Suitable cross-linking agents include, but are not limited to, $C_2$-$C_8$ dialdehyde, $C_2$-$C_8$ diepoxy, $C_2$-$C_8$ monoaldehydes having an acid functionality, $C_2$-$C_9$ polycarboxylic acids, combinations thereof, and the like. These compounds are capable of reacting with at least two hydroxyl groups of a water-soluble polymer.

Other suitable cross-linking methods to form the thin, hydrophilic protecting layer include conventional thermal-, radiation- and photo-cross-linking reactions within the purview of those skilled in the art.

Two important criteria for the selection of a cross-linking agent or method are as follows: (1) the cross-linking agent or method should not dissolve the hydrophilic protecting layer, and (2) the cross-linking agent or method should not induce large dimensional change.

Specific examples of cross-linking agents which may be utilized include, but are not limited to, glutaraldehyde, 1,4-butanediol diglycidyl ether, glyoxal, formaldehyde, glyoxylic acid, oxydisuccinic acid, citric acid, fumaric acid, combinations thereof, and the like. In some embodiments, it may be useful to treat polyvinyl alcohol with a cross-linking agent such as glutaraldehyde.

The amount of cross-linking agent added to the water-soluble polymer forming the hydrophilic protecting layer, in embodiments polyvinyl alcohol, may vary from about 0.1 to about 10 percent by weight of the combined weight of the cross-linking agent and polymer, in embodiments from about 0.5 to about 5 percent by weight of the combined weight of the cross-linking agent and polymer.

In other embodiments, ethylene glycol monomers or oligomers may be cross-linked with ultraviolet (UV) light to form the thin, hydrophilic protecting layer on at least a portion of a surface of the electrospun hydrophobic nanofibrous scaffold. For example, monomers such as di(ethylene glycol) diacrylate (DEGDA) and/or tetra(ethylene glycol) diacrylate (TEGDA), or oligomers such as poly(ethylene glycol) diacrylate (PEGDA), may be cross-linked with UV light to form the thin, hydrophilic protecting layer.

Where utilized, the UV cross-linkable ethylene glycol monomers or oligomer may be dissolved in a suitable solvent, including formic acid, butanol, isopropanol, propanol, ethanol, methanol, acetic acid, water, de-ionized (DI) water, or combinations of DI water with other water miscible solvents, to form a solution having a concentration from about 1% by weight to about 30% by weight of the monomers and/or oligomer, in embodiments from about 5% by weight to about 25% by weight, in embodiments from about 10% by weight to about 20% by weight of the monomers and/or oligomer. For the UV reaction, a photo-initiator, including aromatic ketones, alkyl benzoin, ethers, acetophenone derivatives, 2-hydroxyl-2-methyl-1-phenyl-1-propanone, pentaerythritol triacrylate, and combinations thereof, may be added to the solution so that the photo-initiator is at a concentration from about 0.1% by weight to about 5% by weight, in embodiments about 1% by weight, based on the concentration of the ethylene glycol monomers/oligomer.

Ultraviolet light at a wavelength from about 1 nm to about 400 nm, in embodiments from about 200 nm to about 375 nm, in embodiments about 365 nm, may then be applied thereto to cross-link the UV cross-linkable ethylene glycol monomers or oligomer, thereby forming the thin, hydrophilic protecting layer.

In some embodiments, it may be desirable to add a viscosity enhancer to the solution used to form the thin, hydrophilic protecting layer to reduce the penetration of the coating solution into the scaffold. Suitable viscosity enhancers include, in embodiments, polysaccharide nanofibers that can include cellulose, chitin, collagen, gelatin, chitosan, cellulose nanocrystals, combinations thereof, and the like.

In some embodiments, the nanofibers include cellulose nanofibers (CN) having a diameter of from about 1 nm to about 50 nm, in embodiments from about 4 nm to about 20 nm, in embodiments about 5 nm, and a length of from about 50 nm to about 2000 nm, in embodiments from about 100 nm to about 1000 nm, in embodiments about 200 nm.

Cellulose nanofibers can be prepared according to the procedure described in WO2010/042647, the disclosure of which is incorporated by reference herein in its entirety.

In embodiments, an aqueous suspension of carboxylated cellulose nanofibers (from about 0.001% by weight to about 0.1% by weight, in embodiments about 0.02% by weight) may be added to the solution possessing the polymers, monomers, and/or oligomers used to form the thin, hydrophilic protecting layer. The cellulose nanofibers (CN) in suspension form a gel-like structure, whose viscosity could be fine-tuned through the CN concentration and ionic strength (by salt addition).

The solution possessing the polymers, monomers, and/or oligomers, as well as any optional viscosity enhancer, may be applied to the hydrophobic nanofibrous scaffold by any method within the purview of those skilled in the art, including dipping, spraying, combinations thereof, and the like. Once applied, cross-linking occurs as described above, thereby forming the hydrophilic protecting layer.

The hydrophobic nanofibrous scaffold may include fibers having a diameter from about 1 nm to about 2,000 nm, in embodiments from about 10 nm to about 1,000 nm, in other embodiments from about 50 nm to about 500 nm.

The thickness of the hydrophobic nanofibrous scaffold may vary from about 1 μm to about 500 μm, in embodiments from about 10 μm to about 300 μm, in embodiments from about 30 μm to about 150 μm in thickness.

The thickness of the hydrophilic protecting layer may vary from about 10 nm to about 30 μm, in embodiments from about 100 nm to about 10 μm, in embodiments from about 200 nm to about 1 μm in thickness.

The hydrophobic nanofibrous scaffold possesses pores or voids, which assist in the functioning of the membranes of the present disclosure. The diameter of these voids may be from about 10 nm to about 10 μm, in embodiments from about 50 nm to about 2 μm, in embodiments from about 100 nm to about 0.5 μm.

The use of electrospun nonwoven nanofibrous membranes for MD operations can provide several advantages, including: higher porosity when compared with that of conventional PTFE membranes; and, the ability to reasonably control a range of pore sizes (and pore size distributions). In embodiments, electrospinning technology can be used to control the effective mean pore size and the mean fiber diameter of non-woven nanofibrous membranes over a large range of length scales.

It is believed that simultaneous decreases in mean/maximum pore sizes (which, in turn, can be controlled by the fiber diameter) and membrane thickness can further improve the permeate flux of membranes formed in accordance with the present disclosure.

The membranes thus produced may be used for membrane distillation applications. Membrane distillation can be used for water purification over a very broad range of applications. It is not merely a process that can offer potential breakthroughs for water desalination, but also attractive opportunities to clean up contaminated water, including water from oil fields, especially when there are substantial differences in the nature of impurities, in the number of contaminated components (including inorganics, organics, biological and polymeric materials), and in the amounts of different contaminated components. In embodiments, the water treated from oil fields may be a by-product of shale gas production.

Other more targeted water purifications, such as the purification of water used in the pharmaceutical industry and processing of foods, may also benefit from membrane distillation because of the fundamental difference between membrane distillation and the conventional use of separation membranes.

Membrane distillation has many potential advantages when compared with conventional distillation or pressure-driven separation membrane processes, including: (1) as it is a concentration independent process, it can purify highly contaminated water; (2) the possibility to achieve 'complete' rejection of non-volatile components, e.g., it is likely to be very beneficial for purifications related to shale-gas produced water or seawater (desalination), which has very diverse ranges and amounts of contaminated components; (3) an energy-saving process due to lower operating temperatures and pressures, which can include the use of waste heat to achieve energy efficient operation; and (4) the use of membranes with little mechanical support because of the relatively lower operating pressures needed for membrane distillation.

The following Examples are being submitted to illustrate embodiments of the present disclosure. The Examples are intended to be illustrative only and are not intended to limit the scope of the present disclosure. Also, parts and percentages are by weight unless otherwise indicated. As used herein, "room temperature" refers to a temperature of from about 20° C. to about 30° C.

Example 1

This example formed electrospun polystyrene nanofibrous membranes for membrane distillation. The materials used included the following. Polystyrene (PS, $M_w$=260,000) samples in the particle form were purchased from Scientific Polymer Products, Inc. Other chemicals, including N, N-dimethyl formamide (DMF), sodium dodecyl sulfate (SDS), isopropyl alcohol (IPA), sodium chloride (NaCl), calcium chloride (CaCl$_2$), magnesium chloride (MgCl$_2$), potassium chloride (KCl), sodium fluoride (NaF), sodium nitrate (NaNO$_3$), sodium bicarbonate (NaHCO$_3$), sodium hydroxide (NaOH) and sodium sulfate (Na$_2$SO$_4$), were purchased from Sigma Aldrich and were used as received without further purification.

A polyethylene terephthalate (PET) non-woven mat, purchased from Junyaku Co., Ltd., (Japan), was used as an electrospinning substrate. Two polytetrafluoroethylene (PTFE) commercial membranes, typically used in commercial membrane distillation (MD) operations, were obtained from SolarSpring GmbH (Freiburg, Germany) and Sterlitech Corporation (USA). The sample codes of the two PTFE commercial membranes were marked as PTFE-1 (Solar Spring), PTFE-2 (Sterlitech Corporation), respectively.

Four PS solutions in DMF of varying concentrations (8% by weight, 10% by weight, 12% by weight, and 15% by weight) were first prepared, in which 0.5% by weight of SDS (with respect to DMF) was added to each of the PS solutions to facilitate the electrospinning process. These solutions were stirred continuously until they formed homogeneous solutions.

The above solutions were then used to fabricate PS nanofibrous scaffolds by an electrospinning process. The electrospinning setup included a high voltage power supply, syringe pump and roller collector. For each sample (i.e., the PS solutions at 8% by weight, 10% by weight, 12% by weight, and 15% by weight), respectively, the prepared solution was first filled into a sterile 60 mL plastic syringe. Two syringes of identical volume, containing the same PS concentration solution, were connected to two spinnerets in the electrospinning apparatus. A grounded rotating drum, located at 18 cm below the spinnerets, was used to collect the electrospun membrane deposited on top of the PET non-woven substrate. The rotating speed of the drum was fixed at 100 rpm. The solution flow rate in each spinneret was set at 5 µL/minute. The voltage applied was maintained at 30 kv during the electrospinning process. The electrospinning was carried out at room temperature (25° C.±2° C.) with relative constant humidity (18%). The recovered PS nanofiber/PET composite membranes are referred to as PS-8, PS-10, PS-12 and PS-15, respectively (based upon the concentration of PS in the solution used to prepare the membrane: PS-8 was the membrane formed from the solution having 8% by weight PS; PS-10 was the membrane formed from the solution having 10% by weight PS; PS-12 was the membrane formed from the solution having 12% by weight PS; and PS-15 was the membrane formed from the solution having 15% by weight PS.)

The membranes were then subjected to scanning electron microscopy (SEM) for characterization. A SEM apparatus (LEO 1550) equipped with a Schottky field emission gun and a Robinson backscatter detector was used to observe the surface morphology of electrospun PS nanofibrous membranes. Prior to examination by SEM, all membranes were coated with conductive gold (Au) by a sputter coater model SC6620 under an argon atmosphere.

The mean pore size and pore size distribution of the electrospun PS nanofibrous membranes, compared with commercial PTFE membranes, were investigated by a capillary flow porometer (CFP-1500A, Porous Materials PMI Inc., USA), using a GALWICK™ wetting fluid (Porous Materials Inc.) with a surface tension of 15.9 dynes/cm.

An optical contact angle meter (CAM) (CAM200, KSV instruments, LID) was employed to analyze the contact angle of a water droplet for all tested membranes. In this measurement, the sample was first placed on a glass slide, where a 5 µL water droplet was dropped on the surface of the sample. Digital images were taken by the CAM software, where the water contact angle was calculated by a curve fitting method.

The porosity and thickness of the membranes thus produced were then determined as follows. The membrane porosity was determined by a gravimetric method. The porosity was calculated by the volume of the pores divided by the total volume of the membrane. In this measurement, isopropyl alcohol (IPA) was used as a wetting liquid to penetrate into the pores of the membrane. The weight of the membranes before and after saturation by IPA were measured, where the porosity of the membrane was calculated by the following equation (i):

$$\varepsilon = \frac{(W_w - W_d)/\rho_i}{(W_w - W_d)/\rho_i + W_{PS}/\rho_{PS} + W_{PET}/\rho_{PET}} \quad (i)$$

where $W_d$ is the weight of the dry membrane (including PS and PET non-woven), $W_w$ is the weight of the wet membrane (including PS and PET non-woven), $W_{PS}$ is the weight of the electrospun PS layer, $W_{PET}$ is the weight of the PET non-woven, $\rho_i$ is the isopropyl alcohol density, $\rho_{PS}$ is the PS density and $\rho_{PET}$ is the PET density. The thickness of each of the membranes was tested by a micrometer. The measurements were taken from 20 different locations around the membrane, where the averaged value was used in the calculation.

Morphology of Electrospun PS Nanofibers

Figure 1B:
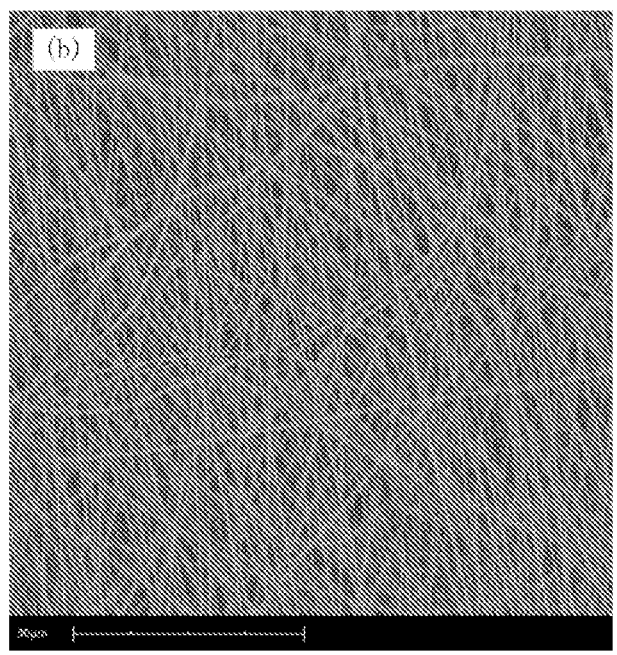
Figure 1C:
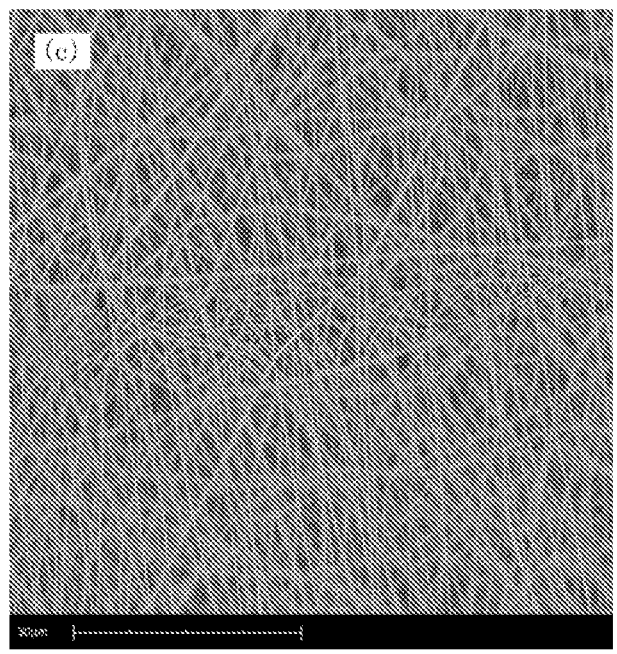
Figure 1D:
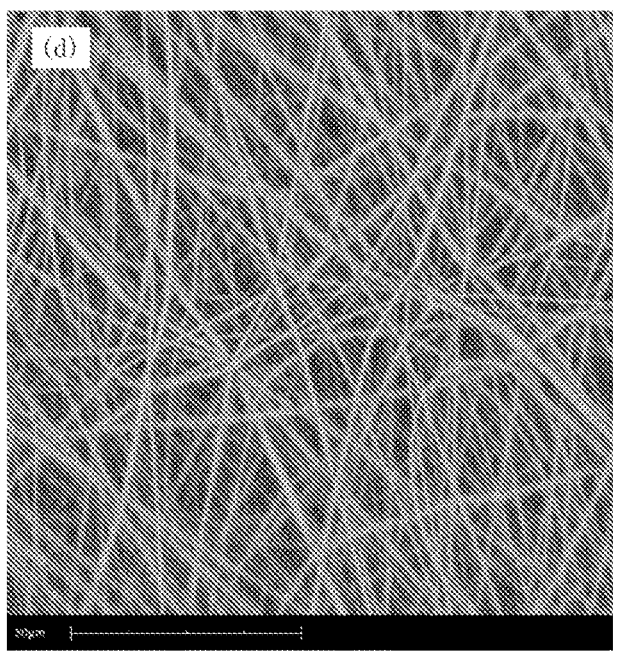

The morphology and average fiber diameter (AFD) of electrospun PS nanofibers have significant effects on the surface structure and properties of the resulting PS nanofibrous membranes, including mean pore size and pore size distribution. Therefore, the preparation of bead-free uniform PS nanofibers is important for fabrication of electrospun PS nanofibrous membranes for MD operations. The targeted mean pore size of the resulting nanofibrous membranes was 0.2 µm, which was achieved by the proper adjustment of the PS solution concentration, SDS (surfactant) addition, and relative humidity. FIG. 1 includes representative SEM images of the PS nanofibers spun from the different concentration solutions of PS (from 8% by weight to 15% by weight) with the addition of 0.5% by weight SDS surfactant: FIG. 1a=8% by weight PS solution; FIG. 1b=10% by weight PS solution; FIG. 1c=12% by weight PS solution; and FIG. 1d=15% by weight PS solution.

As can be seen in FIGS. 1a, 1b, 1c, and 1d, all electrospun PS nanofibers prepared from solutions of PS at different concentrations exhibited bead-free nanofibers with uniform diameter distribution.

Figure 2:
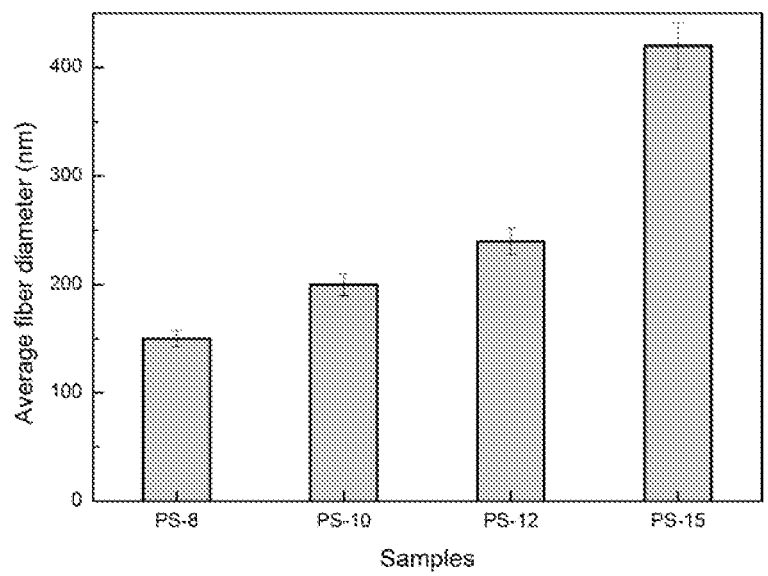
FIG. 2 is a graph showing average fiber diameters of electrospun PS nanofibrous membranes prepared from different concentrations with the addition of SDS surfactant.

FIG. 2 illustrates the corresponding AFD of the PS nanofibers obtained in FIG. 1. It was found that the AFD gradually decreased from 420±21 nm to 150±8 nm with the decrease of solution concentration due to reducing the viscosity. The results demonstrate that solution viscosity is a significant parameter influencing the fiber diameter during electrospinning. The lower viscosity allowed the columbic forces to increase the stretching of the electrospun jet. Moreover, the diameters of the electrospun polymer nanofibers were influenced by the jet size and the polymer concentration in the jet.

The properties of the resulting nanofibrous membranes, including the electrospun PS layer deposited on a PET non-woven substrate (as a strong mechanical support), compared with the PTFE membranes currently used in commercial MD systems, are set forth below in Tables 1 and 2. (The samples are designated as polystyrene (PS)—% by weight—sample #. So, for example, in Tables 1 and 2, PS-8-1 is sample 1 of polystyrene at 8% by weight, PS-8-2 is sample 2 of polystyrene at 8% by weight, PS-10-1 is sample 1 of polystyrene at 10% by weight, PS-10-2 is sample 2 of polystyrene at 10% by weight, etc.) These properties include the mean and maximum pore sizes, porosity, and water contact angle (indicating the hydrophobicity of the membrane). As can be seen from the data in Tables 1 and 2, the properties of electrospun PS/PET membrane (e.g. PS-8-3) can be fine tuned by polymer concentration and other processing parameters to match those of commercial PTFE membranes.

TABLE 1

| Sample | $C^a$ (% by weight) | $AFD^b$ (nm) | $t^c$ (h) | $\delta_{PET}^d$ (μm) | $\delta_{PS}^e$ (μm) | $\delta^f$ (μm) |
|---|---|---|---|---|---|---|
| PS-8-1 | 8 | 150 | 10 | 86 ± 1 | 20 ± 2 | 106 ± 2 |
| PS-8-2 | | | 17 | | 35 ± 2 | 121 ± 2 |
| PS-8-3 | | | 24 | | 53 ± 2 | 139 ± 2 |
| PS-10-1 | 10 | 200 | 10 | | 25 ± 2 | 111 ± 2 |
| PS-10-2 | | | 17 | | 40 ± 2 | 126 ± 2 |
| PS-10-3 | | | 24 | | 60 ± 2 | 146 ± 2 |
| PTFE-1 | — | — | — | — | | 241 ± 2 |
| PTFE-2 | — | — | — | — | | 84 ± 2 |

$^a$Concentration of PS solutions;
$^b$Average fiber diameter;
$^c$Electrospinning collection time;
$^d$Thickness of PET nonwoven substrate;
$^e$Thickness of electrospun PS layer;
$^f$Total membrane thickness;
PTFE-1: SolarSpring GmbH;
PTFE-2: Sterlitech Corporation

TABLE 2

| Sample | Max. pore size (μm) | Mean pore size (μm) | Porosity (%) | Contact angle (θ) |
|---|---|---|---|---|
| PS-8-1 | 0.53 | 0.28 ± 0.13 | 84 | — |
| PS-8-2 | 0.53 | 0.25 ± 0.13 | 85 | — |
| PS-8-3 | 0.44 | 0.19 ± 0.10 | 86 | 113.38 |
| PS-10-1 | 0.60 | 0.31 ± 0.16 | 88 | — |
| PS-10-2 | 0.68 | 0.29 ± 0.18 | 89 | — |
| PS-10-3 | 0.71 | 0.25 ± 0.17 | 91 | 115.29 |
| PTFE-1 | 0.41 | 0.15 ± 0.10 | 80 | 111.28 |
| PTFE-2 | 0.29 | 0.16 ± 0.05 | 80 | 108.93 |

The resulting membranes were then subjected to direct contact membrane distillation (DCMD) measurements. DCMD measurements of the electrospun PS nanofibrous membranes with different thicknesses and mean pore sizes, as well as the two commercial PTFE membranes described above, were carried out for 10 hours of continuous operation using a laboratory scale DCMD apparatus. To obtain these measurements, four kinds of feed solutions were used, including: deionized (DI) water; 35 grams/liter (g/L) NaCl aqueous solutions; seawater (obtained from Long Island Sound); and simulated brackish water. The feed solution that simulated the brackish water contained the following chemicals: NaCl (1070.62 mg/L), $CaCl_2$ (8.88 mg/L), $MgCl_2$ (5.73 mg/L), KCl (0.76 mg/L), NaF (32.05 mg/L), $NaNO_3$ (23.72 mg/L), $Na_2SO_4$ (8.43 mg/L), $NaHCO_3$ (739.2 mg/L), and NaOH (10.39 mg/L).

For the DCMD measurement, the membranes were first cut into 10 cm×10 cm squares. The effective area of each membrane during the measurement was 81 $cm^2$. For each of the four kinds of feed solutions, both hot and cold feed solutions were used. The temperatures of hot and cold feed solutions were maintained at 70° C.±2° and 18° C.±2°, respectively. The flow rates of the hot and cold feed solutions were regulated at a constant value of 0.2 GPM, which were monitored by a flow meter. The permeate water conductivity and the increased weight of permeate water were recorded every half hour over a period of 10 hours using a conductivity meter (commercially available from Oakland) and a digital balance (Pennsylvania Model 7500), respectively. The average flux rate (kg/$m^2$h) was calculated from the recorded weight for each sample. The pH value of the permeate water condensed from all samples was also measured and compared to that of DI water. Additionally, the fluoride concentration of the permeate water from the experiments using the simulated brackish water was tested by using an EXTECH® fluoride reader to ensure that the fluoride component was successfully removed by the membrane.

In other to compare the membrane efficiency, two commercial PTFE membranes were also tested in the DCMD apparatus under the same testing conditions.

The MD performance of the electrospun PS membranes and the two commercial PTFE membranes, using the four different waters (i.e., DI water, simulated brackish water, seawater from Long Island Sound, and water solution containing 35 g/L NaCl) is summarized below in Table 3. It was found that the permeate flux rates of the electrospun PS membranes were generally higher than those of the two commercial PTFE membranes under the same MD operation conditions (hot feed temperature: 70° C.±2°, cold feed temperature: 18° C.±2°, flow rates of hot and cold feed solution: 0.2 GPM), while the rejection ratio of these membrane were about the same.

TABLE 3

| | MD flux rates | | | |
|---|---|---|---|---|
| | Four kinds of feed solutions | | | |
| | DI water | Simulated brackish water | Seawater | 35 g/L NaCl solution |
| Samples | Average flux rate (kg/$m^2$h, 10 h operation time) | | | |
| PS-8-1 | 34.32 ± 0.51 | 29.38 ± 0.95 | x | x |
| PS-8-3 | 26.17 ± 0.66 | 24.94 ± 0.86 | 24.87 ± 0.45 | 19.44 ± 0.88 |
| PS-10-1 | 31.17 ± 0.55 | 31.11 ± 0.51 | x | x |
| PS-10-3 | 23.45 ± 0.40 | 22.22 ± 0.40 | 21.66 ± 0.63 | x |
| PTFE-1 | 25.93 ± 0.90 | 24.94 ± 1.77 | 24.38 ± 0.68 | 18.15 ± 0.81 |
| PTFE-2 | 23.77 ± 0.88 | 21.67 ± 0.85 | 19.87 ± 0.79 | 14.25 ± 0.75 |

Example 2

Figure 3:
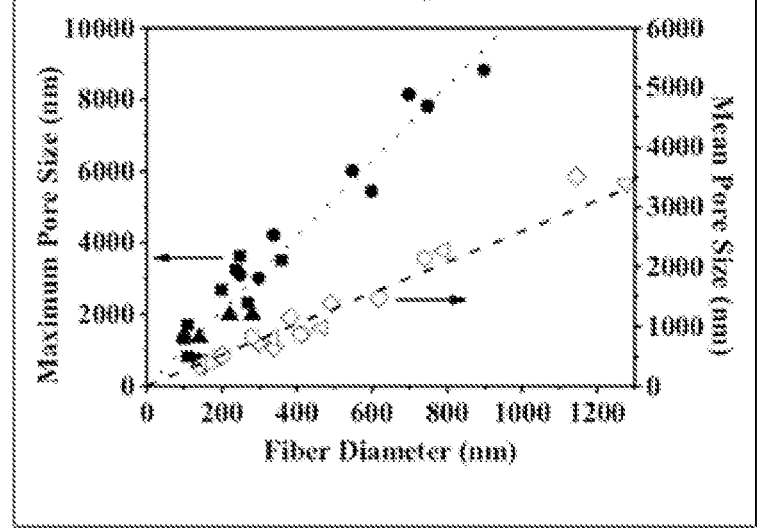
FIG. 3 is a graph showing the relationship between pore size and fiber diameter for membranes of the present disclosure.

This example used other polymers to form electrospun nanofibrous membranes. The processes described above in Example 1 were used, utilizing these other polymers instead of polystyrene, including poly(acrylonitrile) (PAN), polyethersulfone (PES), and polyvinylidenefluoride (PVDF). FIG. 3 shows the relationship between the mean and maximum pore size with respect to the fiber diameter at a constant porosity value (about 80%), where the membrane also exhibits the maximum permeation flux. The different symbols represent different polymers (e.g., poly(acrylonitrile) (PAN), polyethersulfone (PES), polyvinylidenefluoride (PVDF), compared with polystyrene (PS)). As is apparent from FIG. 3, utilizing the methods of the present disclosure, one can produce membranes having a mean pore size from about 100 nm to sizes in microns; these sizes are quite suitable for membrane distillation.

Example 3

This example introduced a hydrophilic coating on electrospun nanofibrous membranes to improve their anti-fouling/anti-scaling properties. A ultraviolet light (UV) induced polymerization method was used to cross-link functional ethylene glycol (EG) monomers and oligomers to fabricate a water-resistant PEG layer on the surface of an electrospun PS layer produced as described above in Example 1. Two EG monomers, di(ethylene glycol) diacrylate (DEGDA) and tetra(ethylene glycol) diacrylate (TEGDA), and one EG oligomer, poly(ethylene glycol) diacrylate (PEGDA) were used.

The coating procedure was carried out as follows. UV cross-linkable EG monomers or oligomer were first dissolved in de-ionized (DI) water to form a solution having a concentration from about 1% by weight to about 3% by weight. An aqueous suspension of carboxylated cellulose nanofibers (about 0.02% by weight) was then added to the EG solution as a viscosity enhancer to reduce the penetration of the coating solution into the PS scaffold. This was because the cellulose nanofibers (CN) in suspension could form a gel-like structure, whose viscosity could be fine-tuned through the CN concentration and ionic strength (by salt addition).

For the UV reaction, a photo-initiator (2-hydroxyl-2-methyl-1-phenyl-1-propanone) was used at a concentration at 1% by weight, based on the concentration of the EG monomers/oligomer. The wet electrospun PS/PET scaffold was first immersed into acidified water (pH=2), and then the mixed EG/CN/photo-initiator solution was cast on top of the scaffold. Excess cast solution was removed by a casting roller. Subsequently, the membrane was transferred to a UV irradiation system (using 365 nm wavelength) and cured in a continuous manner. After the UV curing, the resulting membrane was washed with excess DI water to remove un-reacted monomers. The resulting thin layer of PEG coating significantly improved the anti-fouling and anti-scaling problems of hydrophobic membranes under MD operations.

Example 4

In this example, a hydrophilic barrier layer of cross-linked polyvinyl alcohol (PVA) (having a thickness from about 6 microns to about 8 microns) was cast on the surface of the hydrophobic electrospun membranes prepared in Example 1. The cross-linking procedures were as follows. The cast PVA layer was immersed in gutaraldehyde (GA) (50% aqueous solution) and 0.01 N HCl in acetone solution, for about 24 hours. The cross-linked PVA layer was rinsed in the cross-linking solvent several times and then kept in water before use. It was found the cross-linked PVA layer on the PS nanofibrous scaffold was highly hydrophilic and had excellent anti-fouling properties under prolonged MD operations. This was verified by a long-term (about 2 weeks) fouling test using bovine serum albumin (BSA) solution (1 g/L). The PVA/PS nanofibrous membranes exhibited better anti-fouling properties than comparable commercial PTFE membranes. For example, the flux of the composite layer was about twice as high as that of commercial membranes during the long-term testing, while the rejection was maintained about the same.

While the above description contains many specific details of methods in accordance with this disclosure, these specific details should not be construed as limitations on the scope of the disclosure, but merely as exemplifications of preferred embodiments thereof. Those skilled in the art will envision many other possible variations that are all within the scope and spirit of the disclosure.

What is claimed is:

1. A method for producing a membrane comprising:
applying to a substrate a hydrophobic nanofibrous scaffold including a hydrophobic polymer selected from the group consisting of polystyrenes, polyolefins, polysulfones, fluoropolymers, polyesters, polycarbonates, polynitriles, polyacrylates, polyacetates, polyvinyl chloride, polyacrylic acids, polymethacrylic acids, polysiloxanes, cross-linked forms thereof, derivatives thereof and copolymers thereof, the hydrophobic nanofibrous scaffold including fibers having a diameter from about 1 nm to about 2,000 nm;
casting a hydrophilic polymer solution selected from the group consisting of polyvinyl alcohol, polysaccharides, polyalkylene oxides, ethylene glycols, gelatin, derivatives thereof, and combinations thereof, onto the nanofibrous scaffold;
cross-linking the polymer solution to form a hydrophilic protecting layer having a thickness from about 10 nm to about 30 µm on the nanofibrous scaffold; and
recovering a membrane suitable for membrane distillation.

2. The method of claim 1, wherein the hydrophobic nanofibrous scaffold comprises a hydrophobic polymer selected from the group consisting of polystyrene, polyethylene, polypropylene, polyethersulfone, polyvinylidene fluoride, polyethylene terephthalate, polytrimethylene terephthalate, polybutylene terephthalate, polyacrylonitrile, polymethyl methacrylate, polyvinyl acetate, polydimethylsiloxane, cross-linked forms thereof, derivatives thereof and copolymers thereof.

3. The method of claim 1, wherein the hydrophobic polymer is applied to the substrate as a solution including a solvent selected from the group consisting of pentane, cyclopentane, hexane, cyclohexane, benzene, toluene, 1,4-dioxane, chloroform, diethyl ether, dichloromethane, tetrahydrofuran, ethyl acetate, acetone, dimethylformamide, acetonitrile, dimethyl sulfoxide, nitromethane, propylene carbonate, and combinations thereof.

4. The method of claim 3, wherein the solution including the hydrophobic polymer possesses the hydrophobic polymer in an amount from about 3% by weight of the solution to about 20% by weight of the solution.

5. The method of claim 1, wherein the hydrophobic nanofibrous scaffold is applied to the substrate by a method selected from the group consisting of electrospinning, electro-blowing, solution-blowing, solvent-less multi-layered melt extrusion, melt-blowing, and combinations thereof.

6. The method of claim 1, wherein the hydrophilic polymer solution includes a solvent selected from the group consisting of formic acid, butanol, isopropanol, propanol, ethanol, methanol, acetic acid, water, and combinations thereof.

7. The method of claim 1, wherein the hydrophilic polymer solution possesses the hydrophilic polymer in an amount from about 1% by weight of the solution to about 30% by weight of the solution.

8. The method of claim 1, wherein the hydrophilic protecting layer comprises a polymer selected from the group consisting of polyvinyl alcohol, chitosan, hyaluronan, polyethylene oxide, di(ethylene glycol) diacrylate, tetra(ethylene glycol) diacrylate, poly(ethylene glycol) diacrylate, derivatives thereof, and combinations thereof.

9. The method of claim 1, wherein cross-linking the polymer solution occurs by a method selected from the group consisting of chemical cross-linking, thermal cross-linking, radiation cross-linking, and photo cross-linking.

10. The method of claim 9, wherein cross-linking occurs by chemical cross-linking using a cross-linking agent selected from the group consisting of glutaraldehyde, 1,4-butanediol diglycidyl ether, glyoxal, formaldehyde, glyoxylic acid, oxydisuccinic acid, citric acid, fumaric acid, and combinations thereof.

11. The method of claim 9, wherein cross-linking occurs by photo cross-linking, using a photo-initiator including aromatic ketones, alkyl benzoin, ethers, acetophenone derivatives, 2-hydroxyl-2-methyl-1-phenyl-1-propanone, pentaerythritol triacrylate, and combinations thereof, and ultraviolet light at a wavelength from about 1 nm to about 400 nm.

12. The method of claim 1, wherein the hydrophobic nanofibrous scaffold has a thickness of from about 1 μm to about 500 μm.

13. The method of claim 1, wherein the hydrophobic nanofibrous scaffold possesses pores having a diameter from about 10 nm to about 10 μm.

14. A method for producing a membrane comprising:
applying to a substrate a hydrophobic nanofibrous scaffold including a hydrophobic polymer selected from the group consisting of polystyrenes, polyolefins, polysulfones, fluoropolymers, polyesters, polycarbonates, polynitriles, polyacrylates, polyacetates, polyvinyl chloride, polyacrylic acids, polymethacrylic acids, polysiloxanes, cross-linked forms thereof, derivatives thereof and copolymers thereof, the hydrophobic nanofibrous scaffold including fibers having a diameter from about 1 nm to about 2,000 nm;
casting a hydrophilic polymer solution selected from polyalkylene oxides, ethylene glycols, gelatin, derivatives thereof, and combinations thereof, onto the nanofibrous scaffold;
cross-linking the polymer solution to form a hydrophilic protecting layer having a thickness from about 10 nm to about 30 μm on the nanofibrous scaffold; and
recovering a membrane suitable for membrane distillation.

* * * * *